Figure 1:
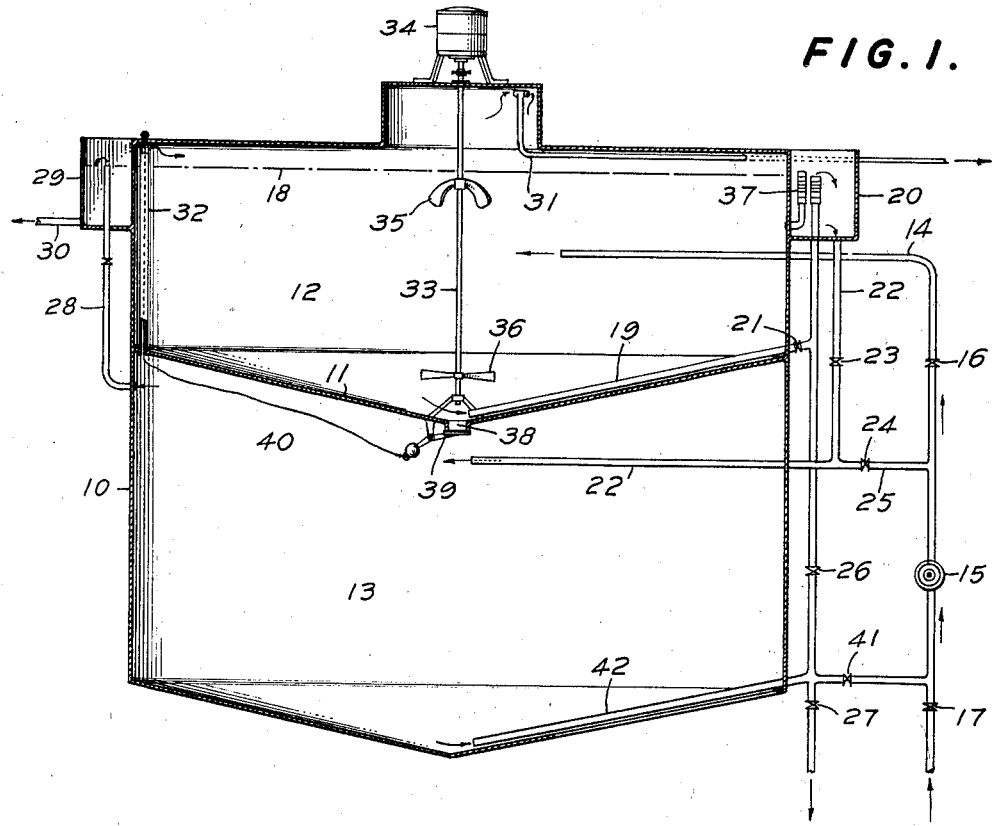

March 3, 1942.  F. A. DOWNES  2,274,953
SLUDGE DIGESTER
Filed Jan. 6, 1940  2 Sheets-Sheet 1

INVENTOR.
FRANK A. DOWNES,
BY
ATTORNEY.

March 3, 1942.                F. A. DOWNES                2,274,953
                             SLUDGE DIGESTER
                        Filed Jan. 6, 1940            2 Sheets-Sheet 2

INVENTOR.
FRANK A. DOWNES,
BY
ATTORNEY.

Patented Mar. 3, 1942

2,274,953

UNITED STATES PATENT OFFICE 2,274,953

SLUDGE DIGESTER

Frank A. Downes, Westport, Conn., assignor to The Dorr Company, Inc., New York, N. Y., a corporation of Delaware Application January 6, 1940, Serial No. 312,640

10 Claims. (Cl. 210—2)

The invention relates to the biologic digestion of sludges made up of solids in suspension that have been derived from wastes of the type of sewage, trade-wastes, and the like. Those solids thereof that are putrescible are rendered substantially innocuous by the digestion process that is basically carried out by organisms and bacterial flora that are called generically biologic and sometimes bacterial. The function of these biologic organisms is to convert the unstable organic substances of the sludge into conversion products that are stable and inodorous. In this conversion process, however, gas is produced that is largely methane ($CH_4$) and since it is combustible, it is advantageous to store it for industrial uses, so one requisite of this invention is to arrange for the effective collection and storage of such gas as may be produced within the digester of this invention.

Also in this conversion process, it becomes important to supply the useful biologic organisms with appropriate environment. It must be recalled that these organisms or bacteria are mobile but not motile. That is, they are not self-moving. Accordingly, food must be brought to them continuously for unlike vertebrates, they eat all the time without rest periods. Similarly, their waste products must be removed from their vicinity, or else they will be smothered by them, or their food so contaminated with such products, that the organisms will starve. Thus, another requisite of this invention is to devise a digester provided with circulating mechanism for moving food to, and excrescenses away from, the useful biologic organisms in the digester.

Sludge derived from sewage varies in the proportions of its constituents although the constituents almost always comprise fats, organics, and inorganics, besides of course liquid which is the medium in which these other things are suspended. These solids have a different rate of settling so that if supplied to a digester tank, and held there in quiescence, the inorganics such as sand would tend to settle as sediment at the bottom of the tank, while the fats, such as scum would rise and float in the top section of the tank. This stratification is to be avoided partly because all of the tank content must be brought within the range of action of the biologic organisms present in the tank, and partly to prevent the unproportional accumulation within the tank of some one constituent during the periodic withdrawal of liquid from the tank. That is, if the material were in the tank in stratified condition, when a quantity of material is withdrawn from say the bottom of the tank, the sand and other sediment would be thus drawn off while all of the scum would be left in the tank. Therefore, still another requisite of this invention is to provide a digester with agitating or circulating means for preventing stratification of suspended solids in the digester tank.

Biologic digestion divides itself into two types of which both are anaerobic (absence of air) and are sequential. That is, one type of bacteria feed on the solid content of the sludge and convert it or at least some of it to liquid phase, so this type of bacteria are called liquefiers. Another type of bacteria, called gasifiers, feed on the liquids produced by the liquefiers, and convert it to gas. Thus we have a two stage process, namely from solid to liquid, and from liquid to gas. Therefore, it has been found more beneficial in the rendering innocuous of putrescibles in sludge, to treat it in two stages or steps. To that end another requisite of this invention is to devise a unitary digester tank in which primary and then secondary digestion can take place.

Heretofore, two stage digestion has been well taken care of where separate tanks could be used. Such a system is typified in the patent to Fischer and Lund, No. 1,989,589, but when two stage digestion is to be carried out on a smaller scale, as when it is necessary to have the two stages housed within a unitary tank, many complications arise. Some of them have been solved by the invention of my co-pending patent application Ser. No. 50,130, filed November 16, 1935 and which on April 2, 1940, matured into Patent No. 2,195,408.

That application discloses a unitary tank structure divided into superposed compartments by a substantially horizontal partition or tray. The upper compartment is provided with means for keeping liquid therein in agitation and preventing stratification of its content, while the lower compartment is arranged to hold liquid in quiescence to permit the settling of the solids content of the liquid in the form of sediment. Sludge to be treated is fed to the upper or primary compartment while treated sludge is withdrawn from the lower or secondary compartment. Partially treated sludge from the primary compartment is automatically and directly transferred to the secondary compartment; gas arising from both compartments is collected; and liquid from which suspended solids has settled is educted from the upper section of the secondary compartment. In that arrangement there is provided free and open hydraulic communication between the two compartments, whereas in the present invention it is desired to use another method of such transfer. Further, in that arrangement, the agitating impellers operating in the upper compartment were offset from the center and used in multiple, whereas in the present invention it is aimed to make use of a single centrally located impeller since being centered seems to give one almost as great a range of action as several offset ones. The rearrangement of transfer means permits this change of location of the impeller means.

An important feature of this invention comprises transferring sludge from the primary digestion compartment to the secondary digestion compartment under conditions whereby the sludge is not normally transferred directly from one compartment to the other but is withdrawn to an outside zone where it can be observed by an operator. By this method, the operator can inform himself of the progress of the digestion process and thus determine what control steps need to be taken in connection with it, if any. Such control features may include the time and quantity of sludge supplied to the primary compartment or zone; change of speed of the impeller means; and adjusting the liquid level in the primary digestion zone.

Another feature is the provision of relief valve between the two compartments, which may be automatic in its operation, for the transfer of abnormal sludge loads from the upper to the lower compartment, or for transferring all of the material from the upper to the lower compartment, in the event the tank is to be emptied. This valve arrangement may be made use of where it is desired to operate the lower compartment only as a simple digester by permitting all material in the upper compartment to pass to the lower one. Other arrangements are provided for operating the lower compartment as a simple digester as represented by piping and a pump means. When so operated, the normally secondary lower compartment becomes a primary digester and as such must have agitation take place in it to discourage stratification or at least to encourage mixing of the heterogeneous constituents of the incoming sewage sludge. This is accomplished under these conditions by means of a pump that is so arranged in piping that material from the lower compartment can be withdrawn therefrom and recycled back into it.

And another feature of this invention, or which may be used in connection with this invention, is an arrangement of parts wherein the tank with its tray, piping, and so on can be assembled, and thereafter it can be completed by the application to it of the top structure therefor that also carries the impeller mechanism and the driving means therefor. This arrangement can be made use of especially if the top structure is made into a gasometer structure with a depending flange, all adapted to float buoyantly upon a body of gas derived from the digesting sludge and trapped in the upper compartment, and which flange is submerged in the sludge for preventing the escape of gas therearound. This arrangement has the added advantage of permitting greater variation in liquid level in the primary zone, than would otherwise be the case, although if used under these conditions, there must also be provided adjustability of overflow from that zone.

Figure 2:
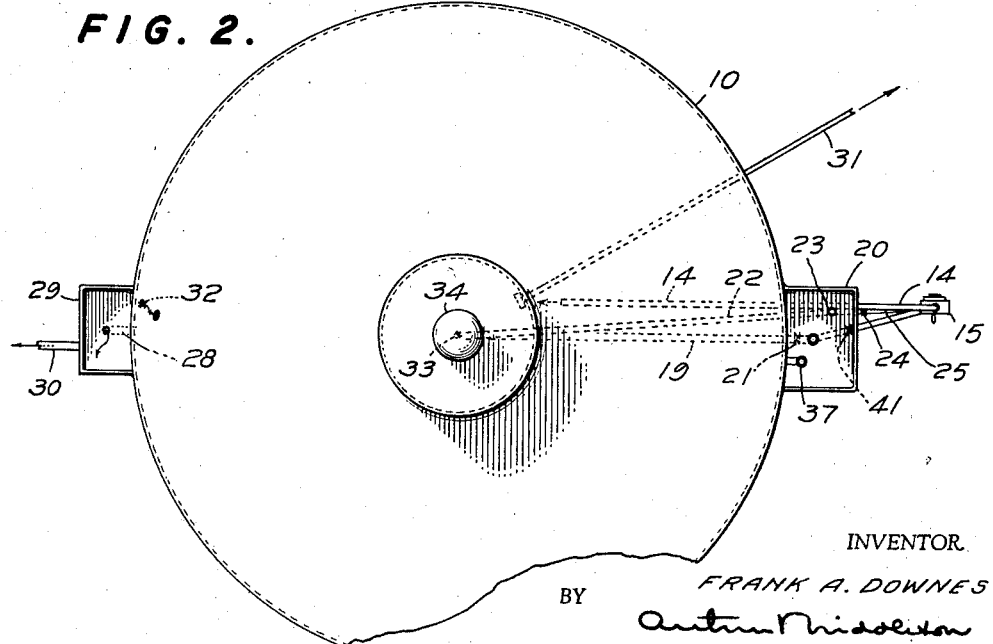
Figure 3:
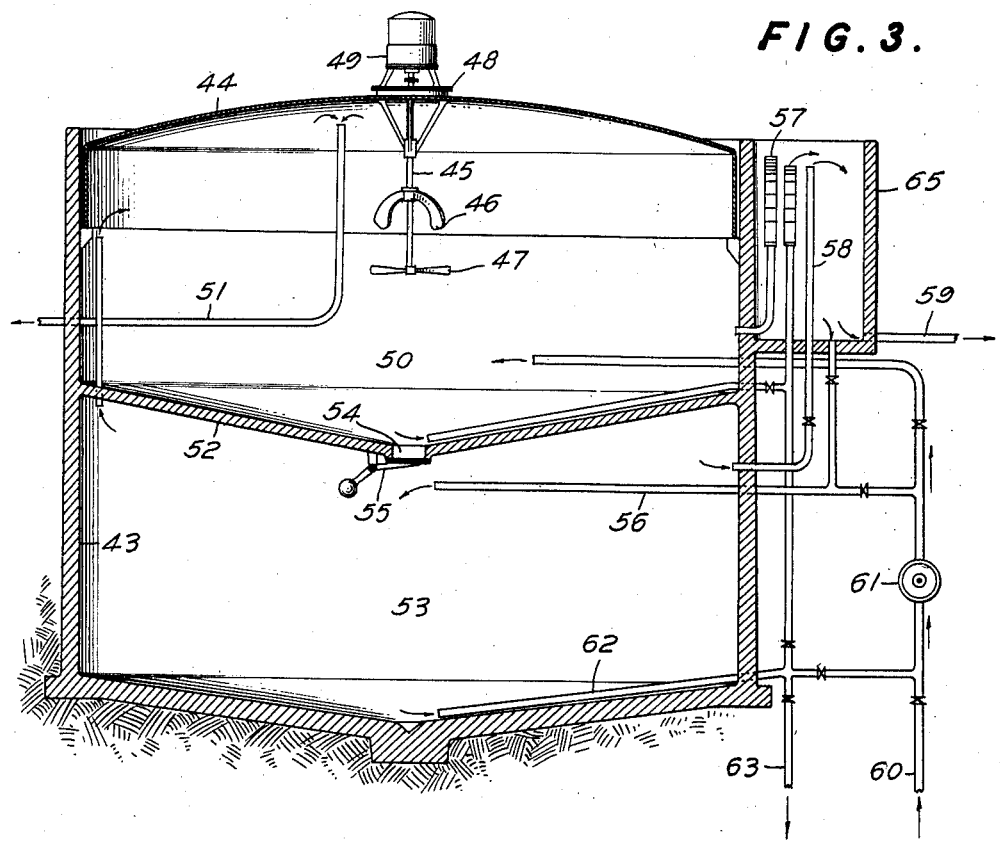
Figure 4:
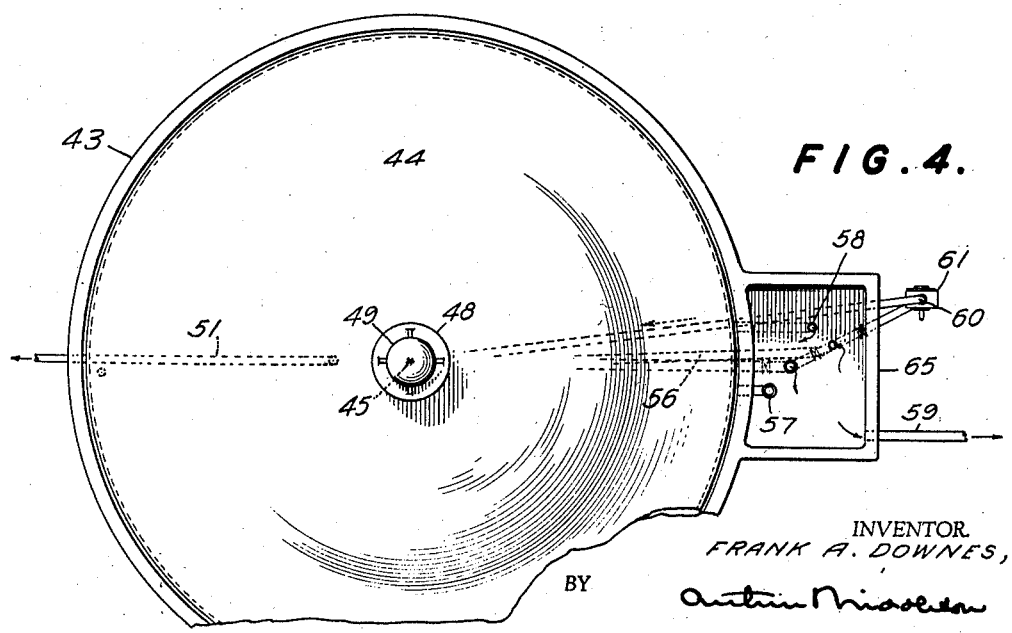

Apparatus which may be effectively used for the purposes generally set forth above, is shown in the accompanying drawings, which form a part of this specification. In these drawings, Figures 1 and 2 are respectively a vertical sectional view and a partial top plan view of one form of apparatus, and Figures 3 and 4 are respectively a vertical sectional view and a partial top plan view of another form of apparatus.

In order that the manner of carrying the invention into practice may be well understood, and with particular reference to Figure 1 in which a unitary digester of the present invention is plainly shown, the tank 10 is disclosed with a closed top and with a horizontal tray 11 dividing said tank into an upper chamber 12 where primary digestion takes place and solids are substantially reduced by liquefying bacteria to liquids, and a lower chamber 13 where digestion is continued and the liquids developed from solids in the upper chamber are substantially converted to gases. These chambers 12 and 13 are respectively known as the upper or primary compartment and the lower or secondary compartment.

In normal operation raw sludge will be delivered into the upper compartment 12 through a feed pipe 14, by means of a sludge pump 15, with the valves 16 and 17 of this feed pipe open.

When the upper compartment is substantially full of sludge, or in other words when the sludge has substantially reached the level of fluid indicated at 18 within the upper compartment, sludge overflows from the lower portion of the compartment through a pipe 19 whose outer outflow end is disposed vertically at about the water line within a transfer or inspection box 20. The overflow from pipe 19, with valve 21 of the latter open, passes downwardly from the transfer or inspection box 20, through a pipe 22, into the upper portion of the lower or secondary compartment 13, valve 23 of pipe 22 being open. At this time valve 24 of a connection 25 between pipe 22 and sludge feed pipe 14 is closed as are valves 26 and 27 in the sludge outlet and disposal pipe which is a part of the overflow or transfer pipe 19.

From the upper portion of the lower compartment 13 an outlet pipe 28 for clear liquid overflows into a box 29 and from thence passes to an outflow pipe 30.

From the top of the upper compartment 12, above the liquid level 18 a gas outflow line 31 extends, and upwardly through this compartment from the upper portion of the lower compartment 13 a gas outlet pipe 32 leads to the upper portion of the upper compartment 12 to a point above the liquid level 18.

Axially of the upper compartment there is shown a vertical shaft 33, the upper and lower ends of which may be mounted in suitable bearings and the upper portion of which is connected to a motor 34 or other suitable source of driving power for rotating the shaft, it being noted that the shaft is provided thereon within the upper portion of the upper compartment 12 with a propeller 35 and has at the lower portion of said compartment an impeller 36 so that the sludge within the upper compartment is maintained in a turbulent state at all times through the action of the propeller 35 in drawing into the center of the compartment fluid which is propelled downwardly into the action of the impeller 36 whose function is to dispel the same at the lower portion of the compartment toward the wall of the tank thereby to thus create a continuous circulation entirely around the axis of the compartment.

Near the upper portion of the upper compartment 12 an emergency outflow pipe 37 extends into the transfer and inspection box 20, with its outer end normally slightly above the level 18 of liquid and this pipe as well as the discharge end of the rising section of the pipe 19 may be provided with overflow rings whereby the height of their discharge ends may be controlled.

In filling the tank in the first instance the valve 24 is opened and the lower compartment may be filled as the upper compartment is filled, before the cycle of operations is initiated, and thereafter it will be noted the lower compartment remains full so that there will be an hydraulic balance between the upper and lower chambers for the effective support of the tray 11. If for any reason, however, the level of fluid is lowered in the lower compartment which would otherwise leave the tray 11 unsupported, the two compartments are placed in communication through a valved opening 38 centrally of the tray, which is normally closed by a weighted valve 39 so that in normal operation the two compartments are isolated from one another. If for any reason it is necessary to do so valve 38 may be opened by means of a manual connection 40.

Since it is obvious the bacteria digest the organic matter only of the sludge and that the inorganic matter present therein will settle to the bottom of the compartments, it is obvious this inorganic matter may be withdrawn through the sludge removal or sludge transfer pipe 19 by opening the valves 26 and 27, and since it is obvious that in some instances the entire digestion may be desirably carried on in the lower compartment 13, it is obvious that by closing valves 16, 23, 26 and 27 and opening valves 24 and 41, agitation of the fluid in the lower compartment 13 may be accomplished by a circulation through the pipe 22, sludge outlet pipe 42 and the sludge pump 15 to thus insure the bringing of the food or solids to the liquefying bacteria in much the same manner that this is normally accomplished within the upper compartment 12 by reason of the circulation induced through the joint action of the propeller 35 and impeller 36.

Substantially the same action takes place in connection with the digester shown in Figures 3 and 4 wherein it is proposed that the tank generally seen at 43 be provided, in place of the closed top of Figures 1 and 2, with a movable top 44 forming a gasometer, the axial shaft 45, with its propeller 46 and impeller 47, depending from an axial support 48 of the top, from a motor 49, and being arranged to extend substantially into the fluid within the upper compartment 50. From the space below this top the gas outlet pipe 51 extends, and within the central portion of the tray 52 normally isolating the upper compartment 50 from the lower compartment 53 is a transfer opening normally closed by a weighted valve 55 similar to the valve 39 previously described.

Sludge overflows from pipe 54 into the transfer or inspection box 65 and from this box passes into the lower compartment 53 through pipe 56. The upper compartment 50 also has an emergency overflow pipe 57 opening into the box 65 and the lower compartment has an outlet pipe 58 for clear fluid which opens into a portion of the box 65 and which outlets from the box through an outlet pipe 59.

Sludge is fed through the sludge feed pipe 60 by means of a sludge pump 61 into the upper compartment, all these pipes being valved so that circulation may be created in the lower compartment 53, where it alone is used as a digester, by means of the sludge pump 61 and the sludge feed and outlet pipes 56 and 62 of the lower compartment, the outlet pipe 62 of the lower compartment as well as the outlet pipe 54 of the upper compartment communicating with the sludge outlet pipe 63.

It is obvious that in either of the described forms of the invention, the use of a propeller and an impeller on the axial shaft of the upper compartment serves to produce a circulation which is downward in the center and upward at the sides of the tank and uniform throughout the entire area of the tank around the shaft so that it effectively functions to pull the floating scum or other floating material downward at the center to a depth where in its dispersement to the tank walls it is combined or mixed with the heavier solids otherwise tending to settle on the bottom of the primary compartment so as to insure the feeding of all organic solids to the bacteria. It is further to be noted that according to both proposed structures the upper and lower, or primary and secondary compartments, while normally isolated from one another, are communicable through the relief valve normally closing the communicating opening of the tray since this is an important feature adding much to the foolproof quality of the general operation of the digester. An operator may draw off too much liquid from the lower compartment in which case the tray might cave in due to the unsupported weight of a full body of liquid in the upper compartment. This feature furthermore cooperates with and is an important factor in connection with the adaptability of the unit as a whole for operation as a two-stage plant or, when flow is abnormally low, as a single stage plant, since by opening the relief valve 39 the bacteria of the upper compartment may be carried into the lower compartment.

As a result of these improvements, the invention provides a digester of unitary nature which is compact, reasonable to install and which at the same time has a wide range of quantity treatment and is, therefore, especially adapted to the needs of a village or a small community.

What is claimed is:

1. A biologic sludge-digestion unit comprising a tank including a top, bottom and side walls and a partition therein dividing the same into an upper primary digestion chamber and a lower secondary digestion chamber, means for feeding sludge into the tank including a feed line provided with a sludge pump and having upper and lower branches of which the upper branch terminates in the upper chamber and the lower branch in the lower chamber and as to which branches each is provided with a valve, a transfer and inspection box located externally with respect to the upper portion of the tank and rising to an elevation higher than that of any of the overflow members herein referred to, a valved sludge-transfer pipe section leading upwardly from the lower portion of the upper primary chamber and terminating in a sludge-transfer overflow member within the box, a valved sludge-transfer pipe section leading downwardly from the lower interior portion of said box and having a connection to the lower branch of the feed line on the delivery side of the valve of said lower branch thereof, a valved sediment-discharge pipe leading from the lower chamber, a liquid sealed supernatant liquid outflow pipe leading from the sludge-holding section of the upper primary chamber and terminating in an auxiliary overflow member at an elevation normally higher than that of the sludge-transfer overflow member but lower than that of the upper interior portion of the tank; gas conducting means leading from the upper portion of both chambers and essentially providing a section leading to the exterior of the tank, a supernatant outflow pipe leading from the upper portion of the lower chamber and terminating in a third overflow member having an elevation substantially higher than that of the partition whereby one of said overflow members determines the normal level of the liquid in the tank and whereby normally approximately equal opposing static pressures are imposed upon opposite sides of the partition within the tank, an emergency transfer means providing a communicating passageway between the interior portion of the upper chamber and the interior portion of the lower chamber and including a relief valve element normally closing said passageway but displaceable from said normal passageway-closing position for avoiding destructive effects on the partition should abnormal differential pressure conditions come into existence on opposite sides of the partition.

2. A biologic sludge-digestion unit as defined in and by claim 1 in which there is means for agitating the sludge in the upper digestion compartment and means for actuating said agitating means and in which as between the sludge-transfer overflow member and the third overflow member at least one is provided with means whereby the overflow elevation thereof is vertically positionable with respect to the other.

3. A biologic sludge-digestion unit comprising a tank including a top, bottom, and side walls and having a partition dividing it into an upper digestion compartment and lower digestion compartment, means for feeding sludge into the tank including a feed line having a sludge pump therein, a valve in the feed line on the suction side of the pump and branching pipe sections leading from the pump of which an upper branch delivers into the upper chamber and a lower valved branch terminates in the lower chamber, a transfer and inspection box rising to an elevation higher than that of any of the overflow members hereinafter referred to, a valved sludge-transfer pipe leading from the lower portion of the upper chamber and comprising a rising branch leading from the delivery side of the valve thereof and terminating in a sludge-transfer overflow member within the box at elevation sufficiently high to insure a normal minimum surface lever of the body of liquid within the upper digestion compartment and having a depending branch leading from the delivery side of the last mentioned valve thereof and provided with two other spacedly disposed lower valves therein, a liquid-sealed outflow pipe leading from the sludge-holding section of the upper compartment and terminating in an auxiliary overflow member normally at a higher elevation than that of the sludge-transfer overflow member but relatively changeable as to elevation whereby the sludge-transfer overflow member may be the higher, means providing gas outlets leading from the upper portion of both compartments and embodying a gas outflow section leading from the unit, an outlet for secondary supernatant liquid leading from the lower digestion compartment and terminating in a secondary overflow member at an elevation substantially higher than the partition, a sediment-discharge pipe leading from the lower portion of lower digestion compartment and having a connection to the aforesaid depending branch of the valved sludge-transfer pipe at a locality between said spacedly disposed lower valves therein, means for agitating sludge within the upper digestion compartment, means for actuating said agitating means, and means providing an emergency passageway leading from the upper compartment to the lower compartment and comprising a check valve movable from passageway-closing position under abnormal pressure conditions on the floor of the partition.

4. A biologic digestion unit comprising a tank for sludges, a partition dividing the interior of the tank into an upper digestion compartment and a lower digestion compartment in the latter of which sedimentation takes place, means for agitating the sludge contents in the upper compartment, means for actuating the agitating means, sludge-feeding means having a supply pipe terminating in the upper compartment and a branch pipe leading therefrom, which branch pipe has a valve therein and is functionable whereby sludge may be optionally delivered therethrough into the lower digestion compartment, means for passing supernatant liquid from the upper section of the lower compartment and terminating in a supernatant overflow member at an elevation substantially higher than that of the partition but lower than that of the upper interior portion of the tank, an inspection box rising to an elevation higher than that of the supernatant overflow member and providing a visible condition-indicating station outside of the tank, a pipe section leading from the lower interior portion of the upper compartment and having a rising terminal embodying a sludge-transfer overflow member disposed at elevation substantially higher than that of the partition but lower than that of the upper interior portion of the tank and arranged for delivering the overflow sludge into the box, and a downflow pipe section leading from the interior of the inspection box and having a valve therein and connected to the lower branch of the feed pipe on the delivery side of the valve in said lower branch.

5. A biologic sludge-digestion apparatus comprising a tank including means normally isolating the upper interior portion of the tank from the lower interior portion thereof for providing therein an upper primary digestion compartment and a lower secondary digestion compartment, piping means comprising an upper branch delivering into the upper compartment and a valve-controlled lower branch that terminates in the lower compartment and as to which the valve of the lower branch is normally closed whereby there is normally a feeding of incoming sludge only into the upper compartment but whereby under abnormal conditions the operator can operate said valve whereby incoming sludge will be delivered into both compartments, gas outlet means leading from the upper portions of both compartments and having a section leading to the exterior of the tank, a valved sludge-transfer conduit section leading from the upper compartment having a transfer overflow member at elevation substantially higher than that of the elevation of the bottom of the upper compartment and lower than that of the upper interior portion of the tank, means for receiving sludge passing said overflow member and having a conduit section leading to the lower compartment and functionable to conduct such overflow sludge to the lower compartment during the normal operation of the apparatus, sediment discharge means leading from the tank, a supernatant outflow means leading upwardly from the lower compartment and terminating in a secondary supernatant overflow member at elevation substantially higher than that of the elevation of the bottom of the upper compartment and lower than that of the elevation of upper interior portion of the tank, an auxiliary supernatant liquid outflow means leading from the upper compartment and terminating in an overflow member normally at elevation higher than that of either of the aforementioned overflow members, and means operable to place the compartments in direct communication independent of said sludge-transfer conduit.

6. A biologic sludge-digestion unit having functionally separate compartments operatively connected for use at the will of an operator as a series of multi-stage digesters at one time and as paralleling single stage digesters at another time, said unit comprising in operative combination and arrangement a tank, partitioning means normally isolating the upper portion of the interior of the tank from the lower portion thereof for forming an upper digestion compartment and a lower digestion compartment, means for feeding sludge into the upper compartment including a sludge pump and a feed line having a main supply connection leading into the upper compartment and a valved branch connection leading into the lower compartment, gas outletting means leading from the upper portion of both compartments, sludge-transfer means leading from the interior of the upper compartment and including a valved section connected into the valved branch of feed line on the delivery side of the valve in said branch, means for discharging sediment from the lower compartment having a valve connection with the feed line on the suction side of the pump, a liquid sealed supernatant liquid outflow pipe leading from the interior of the upper digestion compartment, and a liquid sealed supernatant liquid outflow pipe leading from the interior of the lower digestion compartment, each of said overflow pipes having an overflow section at an elevation substantially higher than that of the bottom of the upper compartment as determined by the partitioning means but lower than that of the top of the upper compartment.

7. A biologic sludge-digestion unit as defined in and by claim 6 and in which the overflow section of the liquid-sealed outflow pipe leading from the interior of the upper compartment which is vertically positionable relative to the high section of the sludge-transfer means that leads from the interior of the upper compartment to the valved branch of the feed line, and is normally at elevation higher than that of said high section of the sludge transfer means, and in which the overflow section of the supernatant outflow pipe leading from the interior of the lower compartment is at elevation normally lower than the aforementioned overflow section of the outflow pipe leading from the interior of the upper compartment.

8. A biologic sludge-digestion unit, comprising a tank, including means normally isolating the upper portion from the lower portion thereof for forming an upper primary digestion compartment and a lower secondary digestion compartment, gas-outletting means leading from the upper portion of both compartments and provided for conducting gas from the unit, means for agitating sludge in the upper compartment, means for actuating the agitating means, sludge-transfer means comprising a section for passing sludge upwardly from the lower interior portion of the upper compartment and terminating in a sludge-transfer overflow member at elevation sufficiently high to insure the retention of liquid in the upper compartment up to a surface level whereat a body of sludge of substantial depth exists in the upper compartment and transfer section for conducting sludge passing said sludge-transfer overflow member into the lower compartment, valved means for discharging sediment from the lower portion of said lower compartment, supernatant outflow means leading from the upper interior portion of the lower compartment and having a rising section terminating in an overflow member, and fluid release means providing an emergency transfer passageway leading from the lower portion of the upper compartment into the lower compartment and having a relief valve element normally closing the passageway but movable from passageway-closing position upon substantially differential pressure on opposite side of the valve element incident to excessive withdrawal of sediment and sludge from the lower compartment.

9. A biologic sludge-digestion unit comprising a tank, a tray disposed horizontally in the tank intermediate the upper and lower ends of the tank and providing within the tank an upper primary digestion compartment and a lower secondary digestion compartment, means for feeding sludge into the upper compartment, sludge-transfer means leading from the lower portion of the upper compartment into the lower compartment and including a box having sides rising substantially above the nomal level of the sludge within the tank for providing a visible inspection station and also including a sludge-transfer overflow member within the box rising above the lower interior portion of the box, means providing a conduit leading from the liquid-holding section of the upper compartment and terminating in an auxiliary overflow member at elevation higher than that of the sludge-transfer overflow member, means for agitating sludge within the upper compartment, means for actuating the agitating means, means for passing gas from the upper portion of both compartments and for ultimately delivering gas from the unit, means for discharging supernatant liquid from the upper portion of the lower secondary compartment and embodying a rising conduit section terminating in a secondary supernatant overflow member at elevation somewhat less than that of the auxiliary overflow member, means for passing sediment from the lower portion of the lower compartment, and means providing direct communication between the compartments including an opening through the tray and a valve forming a downwardly opening closure for said opening.

10. A biologic sludge-digestion apparatus comprising a tank, a tray therein dividing the tank into an upper primary digestion compartment having a gas outlet leading from the upper portion thereof and a lower secondary digestion compartment having gas transfer means leading from the upper interior portion of the lower compartment to the upper compartment whereby the gases from the upper and lower compartments are combined for delivery from the apparatus, supernatant liquid outlet means leading from the upper interior portion of the lower digestion compartment and rising to a secondary supernatant overflow member thereof which is at elevation substantially higher than that of the tray but which is at elevation lower than that of the upper interior portion of the tank, means for feeding sludge into the tank comprising a branch terminating in the upper compartment and a valved branch terminating in the lower compartment, means for agitating liquid within the upper compartment, means for actuating the agitating means, means for transferring sludge from the lower portion of the upper compartment into the lower compartment and comprising a sludge-transfer overflow member located externally of the tank and disposed at elevation substantially higher than that of said tray but lower than that of the upper interior portion of the tank and a valved descending section connected for delivering sludge undergoing transfer into the lower compartment, said tray having an opening provided for direct communication between the upper and lower compartments and equipped with a downwardly opening valve normally closing said opening for relieving excess fluid pressure in the upper compartment in the event of fluid withdrawal from the lower compartment.

FRANK A. DOWNES.